United States Patent [19]
Sato

[11] 3,863,939
[45] Feb. 4, 1975

[54] CHUCK FOR USE IN A DENTAL HANDPIECE

[75] Inventor: Kenzo Sato, Kyoto, Japan

[73] Assignee: Kabushika Kaisha Morita Seisakusho, Kyoto, Japan

[22] Filed: Aug. 17, 1973

[21] Appl. No.: 389,374

[30] Foreign Application Priority Data
Aug. 31, 1972  Japan.............................. 47-87426

[52] U.S. Cl.............................. 279/1 SG, 279/1 Q
[51] Int. Cl............................................ B23b 31/08
[58] Field of Search................ 279/1 SG, 1 Q, 1 SJ; 403/225, 228, 226, 221, 377

[56] References Cited
UNITED STATES PATENTS
| | | | |
|---|---|---|---|
| 2,468,985 | 5/1949 | Krotz | 403/225 |
| 2,989,317 | 6/1961 | Staunt | 279/1 Q |
| 3,324,553 | 6/1967 | Borden | 279/1 Q |
| 3,716,247 | 2/1973 | Sato | 279/1 SG |

*Primary Examiner*—J. M. Meister
*Assistant Examiner*—Z. R. Bilinsky
*Attorney, Agent, or Firm*—Christensen, O'Connor, Garrison & Havelka

[57] ABSTRACT

A chuck for use in a dental handpiece comprising a tubular body disposed in the axial bore of the rotor of the handpiece and a pair of tubular fixing members disposed in the axial bore at the opposite sides of the tubular body. When the bar of a rotary dental tool is inserted into the handpiece for connection therewith, the tubular body firmly grips the bar with the fixing members holding the bar so as to prevent nutational movement of the bar as the tool is being rotated.

4 Claims, 6 Drawing Figures

PATENTED FEB 4 1975 3,863,939

CHUCK FOR USE IN A DENTAL HANDPIECE

This invention relates to a chuck for use in a dental handpiece for holding a rotary dental tool in the rotor of the handpiece.

As is well known, the chuck of the type with which this invention is concerned is intended to hold a dental tool in the rotor of a dental handpiece, when the former is inserted into the latter, so as to be rotated therewith. It is essential that the chuck should hold the tool so securely that the latter will not be slipped out while it is being rotated. Experience shows that as the dental tool is rotated, a centrifugal force is produced to cause the axis of rotation of the tool to nutate or vibrate, and at a high speed of rotation such as 300,000 to 600,000 r.p.m., the centrifugal force and consequently the vibration becomes so great as to make it impossible to use the dental tool for treatment.

Chucks of the type have hitherto been made of metal or plastic material. They are comparatively small in size and if they are made of metal, in order to give them a sufficient mechanical strength, the metal must be of a high grade and at the same time accurate machining and proper thermal treatment are required. Since friction between two surfaces of metal is comparatively small, the tool tends to slip out of the chuck while they are being rotated together.

The chuck which is made of a plastic material resiliently holds the dental tool so that the above-mentioned disadvantage of the metal chuck is avoided. However, the nutational movement when repeated will cause deterioration and deformation of the material of the chuck, with resulting shortening of the life of the chuck and weakening of the force with which the chuck holds the tool.

Accordingly, the primary object of the invention is to increase the durability of the chuck which is made of an elastic plastic material such as rubber and synthetic resins.

Another object of the invention is to prevent weakening of the force with which the chuck holds the dental tool.

The chuck constructed in accordance with the invention is enclosed in an axial bore formed in the rotor of a dental handpiece and secured in place for rotation with the rotor. A dental tool is inserted into the bore of the rotor so as to be held by the chuck. The chuck comprises a tubular body which is forced into the axial bore of the rotor to form an interference fit therebetween due to the elasticity of the material of the chuck. A tubular fixing member is provided at each end of the chuck within the bore of the rotor, and by securing the fixing members to the rotor any displacement of the chuck is prevented. The chuck has along its whole length or in part thereof an inner diameter smaller than the outer diameter of the bar of a dental tool that when the bar is pushed into the chuck, the chuck is temporarily deformed. The elasticity of the deformed portion of the chuck provides a sufficient force by which the chuck securely holds the tool. The chuck may advantageously be formed with at least one outer annular portion or projection having an enlarged outer diameter which is a little greater than the inner diameter of the bore of the rotor. The annular enlarged-diameter portion naturally leaves the remaining portions of the chuck relatively reduced in outer diameter, so that when the bar of a dental tool is pushed into the chuck, the reduced-diameter portions are expanded so that the restoring force of the expanded portions increases the gripping force of the chuck on the bar of the dental tool.

The primary function of the chuck is to grip the bar of a dental tool, and the chuck alone is not sufficient to prevent the previously mentioned nutational movement of the dental tool and consequently decrease in the gripping force of the chuck due to the lasting deformation of the material thereof.

The fixing tubular members disposed at the opposite ends of the chuck serve to prevent the nutation of the dental tool, and to this end the inner diameter of the fixing members is made equal to or slightly greater than the outer diameter of the bar of the dental tool so as to make as small as possible the gap or play between the inner circumferential surface of the members and the outer circumferential surface of the bar. This arrangement helps prevent the nutational movement of the bar.

The invention will be explained in detail with reference to the accompanying drawings; wherein.

Referring in detail to the drawings, there is shown an air-turbine rotor 1 having a plurality of radial blades 2, to which compressed air is applied from an external source so as to rotate the rotor about its axis in the well-known manner. The rotor is formed with an axial through bore 1', in which a chuck 3 is provided. The chuck is made of rubber or any other plastic material such as synthetic resin which has a high degree of elasticity or resiliency, a high degree of resistivity against wear and a high coefficient of friction. One example of such material is urethane rubber.

Figure 1:
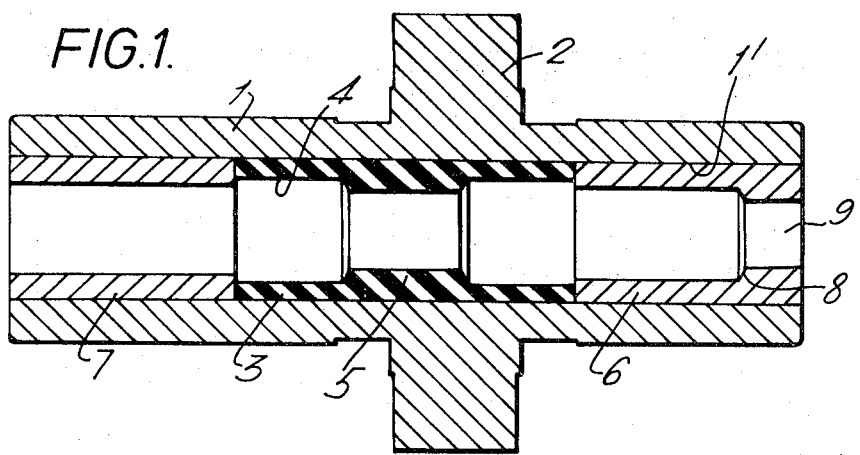
FIG. 1 is a longitudinal section of one embodiment of the invention.
Figure 2:
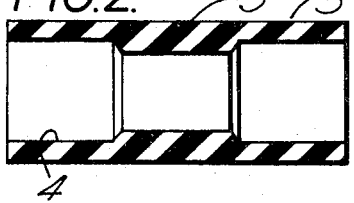
FIG. 2 is a longitudinal section of the cluch shown in FIG. 1.

The chuck 3 comprises a tubular body which is fixed within the axial bore of the rotor by means of, say, interference fit. In the embodiment of FIGS. 1 and 2, the middle portion of the inner circumferential surface 4 of the chuck is reduced in diameter so as to form an annular inner projection 5, the inner diameter of which is a little smaller than the outer diameter of the bar of the dental tool (not shown) to be held by the chuck, so that when the bar is inserted into the chuck, it pushes, compresses and deforms the material of the annular projection 5. A portion of the deformed annular projection 5 temporarily protrudes into the narrow gap between the inner surface 4 of the chuck and the outer surface of the bar, with the elasticity of the material compressed and deformed providing a sufficient gripping force of the chuck on the bar of the dental tool. This enables transfer of rotation of the rotor to the bar through the chuck while preventing the bar from slipping out therefrom.

A pair of fixing members 6 and 7 are disposed at the opposite ends of the chuck 3. These members also comprise a tubular body made of metal and having an inner diameter sufficient to receive therein the bar of a dental tool with as small a gap or play as possible being left between the inner circumferential surfaces of the members 7 and 8 and the outer circumferential surface of the bar. In other words, the inner diameter of the tubular fixing members 6 and 7 is made substantially equal to or slightly greater than the outer diameter of the bar of the dental tool to be inserted therethrough.

The fixing member 6 is secured to the rotor by means of welding, adhesive material or screws, or the member may be formed as an integral part of the rotor. An annular shoulder 8 is formed on the inner circumferentail surface of the member 6 adjacent to the righthand end thereof as viewed in FIG. 1. As the bar of a dental tool is inserted into the rotor from the left-hand side thereof, its forward (right-hand) end abuts on the shoulder 8 so that any further insertion of the bar through the rotor is prevented.

The end portion of the fixing member 6 adjacent to the shoulder 8 is formed with a bore 9. When the dental tool is to be separated from the rotor, a pin or any other suitable member may be put into the bore 9 so as to push the tool bar out of the rotor.

The other fixing member 7 is also secured to the rotor by means of welding, adhesive material or screws after the chuck has been placed in the rotor bore. Thus the two fixing members sandwich the chuck therebetween so as to securely hold the chuck in place inside the rotor.

A rotary dental tool (not shown) to be attached to the rotor has its bar put into one end (the left-hand end in FIG. 1) of the rotor bore. The chuck grips the tool bar inserted therethrough, with the gripping force being provided chiefly by the inner annular projection 5 in the embodiment in FIGS. 1 and 2. The fixing members 6 and 7 disposed at the opposite sides of the chuck 3 hold the opposite side portions of the tool bar gripped by the chuck. The function of the members 6 and 7, however, is primarily to prevent the nutational motion of the tool bar. In the prior art it has been the chuck itself that functions to prevent nutation of the tool bar. In the present invention, however, the chuck 3 does not directly serve to prevent nutation of the rotating tool bar, so that any lasting deformation of the chuck is prevented thereby maintaining the effective gripping force of the chuck for a long time.

Figure 3:
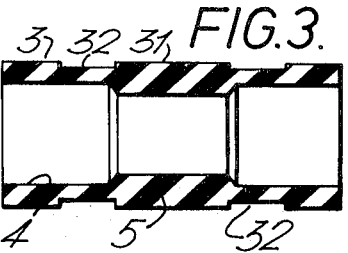
FIGS. 3 – 5 are longitudinal sections of modified forms of the chuck.
Figure 4:
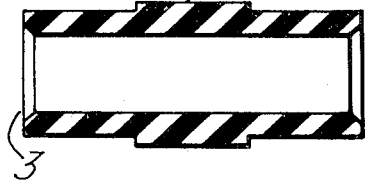
Figure 5:
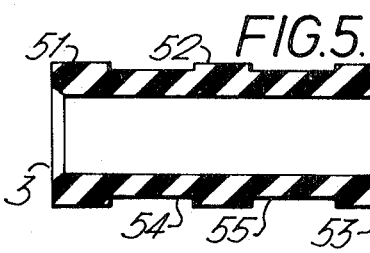

FIGS. 3 – 5 show modified forms of the chuck. In FIG. 3 in addition to the inner annular projection 5 the chuck 3 is formed with an outer annular projection 31 defined by a pair of outer annular grooves 32 formed at the opposite sides of the projection 31.

In FIG. 4 no inner annular projection is formed, but the inner diameter of the chuck 3 is made slightly smaller than the outer diameter of the tool bar just like the inner annular projection 5 of FIGS. 2 or 3 so as to grip the tool bar by the whole length of the inner surface of the chuck. The chuck of FIG. 4 is provided with a single outer annular projection 41, the outer diameter of which is such as to provide an interference fit between the rotor and the chuck inserted thereinto.

In FIGS. 3 and 4 when the tool bar is inserted through the chuck, the circumferential wall of the chuck tends to resiliently expand at the opposite sides of the outer projections 31 and 41, so that the restoring force due to the resiliency of the material provides a sufficient gripping force on the tool bar.

FIG. 5 shows a modification of the chuck of FIG. 4. In FIG. 5 the single outer annular projection 41 of FIG. 4 is replaced by three axially spaced outer annular projections 51, 52 and 53 separated by grooves 54 and 55. When the tool bar is inserted into the chuck, the bottom walls of the grooves tend to be bulged or expanded so that the resiliency of the material produces a strong gripping force on the tool bar in the same manner as in the embodiment of FIG. 3.

Figure 6:
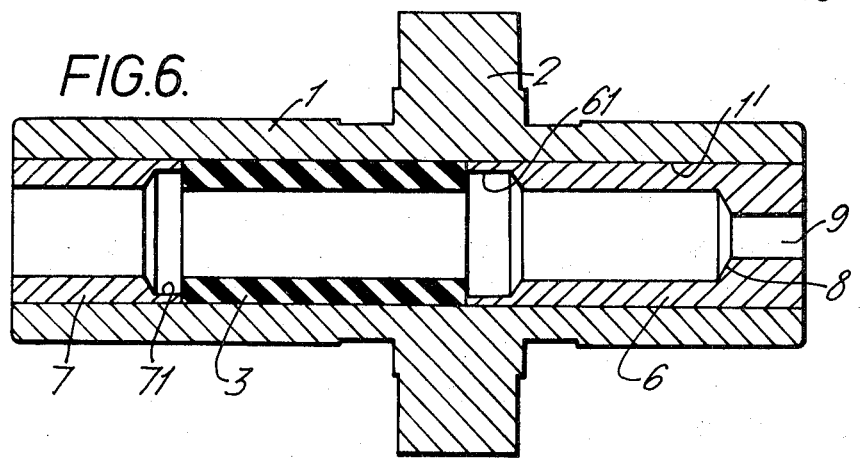
FIG. 6 is a view similar to FIG. 1 but showing another embodiment of the invention.

FIG. 6 is a view similar to FIG. 1 but showing a different form of the chuck and the fixing members. Here, the chuck 3 has no such outer annular projections as 41 or 52 in FIGS. 4 or 5. The outer diameter of the chuck in FIG. 6 is such as to provide an interference fit between the rotor and the chuck inserted thereinto, and the inner diameter of the chuck is slightly smaller than the outer diameter of the tool bar just as in the case of FIG. 4. The chuck is placed in the rotor with a pair of fixing members 6 and 7 disposed at the opposite sides of the chuck as shown in FIG. 6. When the tool bar is inserted through the chuck, the chuck is pushed and deformed. If the fixing members 6 and 7 of FIG. 6 were of the same configuration as those of FIG. 1, there would be no room or gap for accommodating the deformed portion of the material of the chuck so that the chuck could not work properly. To avoid this, the fixing members 6 and 7 in FIG. 6 are provided at the ends adjacent to the opposite ends of the chuck with an annular recess 61, 71 having an inner diameter a little greater than the inner diameter of the chuck 3. When the tool bar is inserted into the chuck, some of the material of the deformed chuck protrudes into the annular recess thereby to allow passage of the tool bar through the chuck while providing a sufficient gripping force of the chuck on the tool bar.

As described above, the chuck constructed in accordance with the invention comprises a tubular body made of a resilient or elastic material so that when a rotary dental tool is inserted into the chuck, the chuck is compressed and deformed and the resiliency of the material provides a strong gripping force on the tool bar. The metallic fixing members disposed at the opposite sides of the chuck prevent the nutational movement of the tool as it is being rotated. Over the prior art chuck which functions both to hold the dental tool and to prevent its nutational movement, the chuck of the invention has the advantages that the durability of the chuck in use is greatly improved and that the danger of the tool rotating at a high speed slipping out from the chuck due to weakening of the gripping force thereof can effectively be prevented.

What I claim is:

1. A chuck for use in a dental handpiece having therein a rotor provided with an axial through bore, comprising a tubular body provided in said axial bore and fixed to the inner surface thereof for simultaneous rotation with said rotor, said tubular body being made of an elastic material and having along its whole length an inner diameter such that when said tool bar is inserted into said tubular body, said tubular body is deformed and compressed along its whole length so that the elasticity of the material of said tubular body produces a sufficient gripping force of said tubular body on said tool bar; and at least one tubular fixing member provided adjacent to said tubular body in said axial bore of said rotor and secured to the inner surface thereof, said fixing member being made of metal and having an inner diameter such that the inner surface of said tubular fixing member restricts the nutation of said dental tool inserted therethrough as it is being rotated, said fixing member provided at the end of said chuck adjacent to one end of said tubular body with an annular recess having an inner diameter greater than the inner diameter of said tubular body so that part of the material of said deformed tubular body protrudes into said annular recess.

2. The chuck of claim 1, wherein said tubular body is provided with an outer annular projection having an outer diameter such that when said tubular body is inserted into said rotor, said outer projection is pressed against the inner surface of said axial bore of said rotor so as to assure simultaneous rotation of said rotor and said tubular body.

3. The chuck of claim 1, wherein said tubular body is provided with a plurality of outer annular projections each having an outer diameter such that when said tubular body is inserted into said axial bore of said rotor, said outer annular projections are pressed against the inner surface of said axial bore to assure simultaneous rotation of said rotor and said tubular body.

4. A chuck for use in a dental handpiece having therein an air turbine rotor having an axial through bore, comprising: a tubular body provided in said axial bore and fixed to the inner surface thereof for simultaneous rotation with said rotor, said tubular body being made of an elastic material, said tubular body having along its whole length an inner diameter such that when said tool bar is inserted into said tubular body, said tubular body is deformed and compressed along its whole length so that the elasticity of the material of said tubular body produces a sufficient gripping force on said tool bar; and a pair of tubular fixing members disposed at the opposite sides of said tubular body in said axial bore and secured to the inner surface thereof, said fixing members being made of metal and having an inner diameter such that the inner surface of each said tubular fixing member restricts the nutation of said dental tool as it is being rotated; and wherein each of said tubular fixing members is provided at the end thereof adjacent to one end of said tubular body with an annular recess having an inner diameter greater than the inner diameter of sais tubular body so that part of the material of said deformed tubular body protrudes into said annular recess.

\* \* \* \* \*

PO-1050
(5/69)

UNITED STATES PATENT OFFICE
CERTIFICATE OF CORRECTION

Patent No. 3,863,939      Dated February 4, 1975

Inventor(s) SATO, Kenzo

It is certified that error appears in the above-identified patent and that said Letters Patent are hereby corrected as shown below:

To correct the spelling of:

Assignee: KABUSHIKI KAISHA MORITA SEISAKUSHO

Signed and sealed this 13th day of May 1975.

(SEAL)
Attest:

RUTH C. MASON
Attesting Officer

C. MARSHALL DANN
Commissioner of Patents
and Trademarks